United States Patent [19]

DeGeeter et al.

[11] Patent Number: 4,618,604
[45] Date of Patent: Oct. 21, 1986

[54] COMPOSITION AND METHOD FOR IMPROVING FEED UTILIZATION OR TISSUE PRODUCTION IN ANIMALS

[75] Inventors: Melvin J. DeGeeter, Chesterfield; Gregory M. Lanza, Kirkwood; Billy D. Vineyard, St. Louis, all of Mo.

[73] Assignee: Monsanto Company, St. Louis, Mo.

[21] Appl. No.: 620,412

[22] Filed: Jun. 14, 1984

Related U.S. Application Data

[63] Continuation-in-part of Ser. No. 535,498, Sep. 26, 1983, abandoned.

[51] Int. Cl.⁴ ...................... A61K 31/36; A61K 31/66
[52] U.S. Cl. .................................... 514/130; 514/114; 514/124; 514/132; 514/140
[58] Field of Search ............... 514/114, 124, 130, 132, 514/140

[56] References Cited

U.S. PATENT DOCUMENTS 4,130,410 12/1978 Sabacky ................................. 71/86
4,273,768 6/1981 Kochansky et al. ................ 424/222

*Primary Examiner*—Frederick E. Waddell
*Attorney, Agent, or Firm*—George R. Beck; Dennis R. Hoerner; J. Timothy Keane

[57] ABSTRACT

A composition and method for improving feed utilization or tissue production in animals are disclosed. At least one substituted phenylphosphinic acid derivative or pharmaceutically acceptable salts thereof is administered as a feed supplement at a daily dosage between about 0.005 and 350 mg/animal. The specific daily dosage depends on the specie, weight of the animal and the desired production trait to be improved.

13 Claims, No Drawings

COMPOSITION AND METHOD FOR IMPROVING FEED UTILIZATION OR TISSUE PRODUCTION IN ANIMALS

BACKGROUND OF THE INVENTION

This is a continuation-in-part of copending application Ser. No. 535,498, filed Sept. 26, 1983, now abandoned.

The present invention relates to a composition and method for improving feed utilization or tissue production in animals which comprises administering an effective amount of at least one substituted phenylphosphinic acid derivative or pharmaceutically acceptable salt thereof.

It has been reported that compounds such as steroids and antibiotics, particularly those effective against gram-positive bacteria, are effective agents to enhance weight gain and feed to weight gain efficiency in animals. While the above-described compounds are useful, new compounds are being searched for which have a greater efficacy, lower production cost and/or reduced side-effects in the animal.

It is the overall object of the present invention to provide a method for improving feed utilization or tissue production in animals.

Accordingly, it is an object of the present invention to provide a feed supplement composition capable of improving feed utilization or tissue production in animals.

It is yet another object of the present invention to provide a method of administering compositions comprising at least one of the substituted phenylphosphinic acid derivatives or pharmaceutically acceptable salts thereof to improve feed utilization or tissue production in animals.

These and other objects, features and advantages of the present invention will be evident to one skilled in the art from the following description.

SUMMARY OF THE INVENTION

The present invention provides a method for improving feed utilization or tissue production in animals and more particularly, a feed supplement composition comprising a dispensing agent and at least one of the substituted phenylphosphinic acid derivatives represented by the structure:

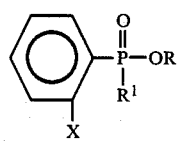

(I)

where R is selected from the group consisting of hydrogen, alkyl, aryl and suitable cationic radicals forming pharmaceutically acceptable salts thereof; $R_1$ is lower n-alkyl; and X is selected from the group consisting of hydroxy, halo, amino, carboxy, nitro, lower n-alkoxy and lower n-alkylamino.

The compositions can be administered by various conventional methods such as injection, infusion, time-release implant, transdermally and the like, but are preferably administered as a feed supplement in the form of feed or drinking water additives. The daily dosage range as a feed supplement is between about 0.005 to 350 mg/animal. The specific daily dosage depends on the specie and weight of the animal and the desired production trait to be improved such as feed efficiency. It should be understood, however, that all chemical species will not necessarily produce all efficacious results. For example, certain compounds will produce an increased feed efficiency, others an increased average daily weight gain and still others will produce both increased feed efficiency and increased average daily weight gain.

DETAILED DESCRIPTION OF THE PREFERRED EMBODIMENTS

Compounds suitable for use in the present invention are substituted phenylphosphinic acid derivatives represented by the structure:

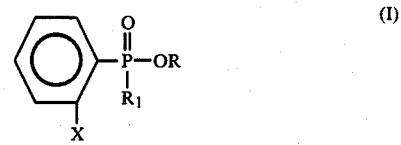

(I)

where R is selected from the group consisting of hydrogen, alkyl, aryl and suitable cationic radicals forming pharmaceutically acceptable salts thereof; $R_1$ is lower n-alkyl; and X is selected from the group consisting of hydroxy, halo, amino, carboxy, nitro, lower n-alkoxy and lower n-alkylamino.

As used herein, the term feed utilization refers to the amount of feed consumed per unit of weight gain. Feed utilization is indicated by the ratio of the feed consumed divided by weight gain. An increased or improved feed utilization is indicated by a decrease in the feed utilization ratio. By "tissue" is meant an aggregation of similarly specialized cells united in the performance of a particular function. Accordingly, "tissue" is meant to include, but is not limited to, muscle mass or other cell mass such as the egg mass in avian species. It will be evident to those skilled in the art that increased tissue production is most easily determined by an increased body weight.

While not fully understood, the lone pair of electrons present in the X substituent is believed to form a chelate with an unknown metal ion and one of the two oxygen atoms bonded to the phosphorus atom. The lone pair of electrons may be supplied by atoms such as, but not limited to, oxygen, nitrogen and halogens. It should be understood, however, that the atom having the lone pair of electrons need not be bonded directly to the phenyl ring. Due to the steric effects attendant with branching, it is preferred that the X substituent, when hydrocarbyl, be unbranched and have 1 to 4 carbon atoms, inclusive. Accordingly, suitable X groups include, but are not limited to, carboxy, hydroxy, halo, amino, nitro, lower n-alkoxy, and lower n-alkylamino. It should be understood, however, that any X substituent which promotes the above-described chelation will likely provide the disclosed advantageous results and should be considered equivalents within the scope of the present invention.

As used herein, the term "alkyl" refers to radicals of the general formula $C_nH_{2n+1}$ where n ranges from 1 to 8 such as methyl, ethyl, propyl, butyl, pentyl, hexyl, octyl, and isomeric forms thereof. The term "lower n-alkyl" refers to unbranched alkyl radicals where n ranges from 1 to 4 such as methyl, ethyl, propyl and butyl. By "lower n-alkoxy" is meant a substituent group consisting of a lower n-alkyl radical bonded to the base molecule through an oxygen linkage such as methoxy, ethoxy, propoxy, butoxy and the like. The term "lower n-alkylamino" refers to amino radicals having preferably one lower n-alkyl substituent thereon. The term "carboxy" is meant to include the free acid and salt or esters thereof which would be hydrolyzed in the acidic gastric fluid of the animal gut. It should also be recognized that non-interfering substituents may be present on the phenyl ring and that complexes, ions and salts thereof, as well as other modifications of the non-interfering substituents, will likely provide the disclosed results and should be considered equivalents within the scope of the present invention. Moreover, all R substituents which are hydrolyzed in the gut of the animal should be considered equivalents within the scope of the present invention. The term "aryl" refers to aromatic radicals such as benzyl, phenyl, tolyl, xylyl and the like. The expression "pharmaceutically acceptable salts" is intended to include, but is not limited to, such salts as the alkali metal salts, alkaline earth metal salts, aluminum salts, ammonium salts and salts with pharmaceutically acceptable nontoxic organic amines.

It should be understood, however, that all chemical species will not necessarily produce all efficacious results. For example, certain compounds will produce an increased feed efficiency, others an increased average daily weight gain and still others will produce both increased feed efficiency and increased average daily weight gain.

Examples of suitable compounds, described generally by Formula (I) and acceptable salts thereof include:
(1) 2-methoxyphenylmethylphosphinic acid
(2) 2-methoxyphenylethylphosphinic acid
(3) 2-ethoxyphenylmethylphosphinic acid
(4) 2-methoxyphenylmethylphosphinic acid ammonium salt
(5) 2-chlorophenylmethylphosphinic acid
(6) 2-nitrophenylmethylphosphinic acid
(7) 2-methoxyphenylmethylphosphinic acid isopropyl ammonium salt
(8) methyl-2-methoxyphenylmethylphosphinate
(9) 2-hydroxyphenylmethylphosphinic acid
(10) 2-carboxyphenylmethylphosphinic acid
(11) 2-aminophenylmethylphosphinic acid hydrochloride.salt.

The substituted phenylphosphinic acid derivatives and salts thereof can be prepared in accordance with the procedures described in commonly assigned U.S. Pat. Nos. 3,992,273 and 4,130,410. In general, the compounds contemplated by the present invention can be prepared by a photolysis reaction illustrated generally as follows:

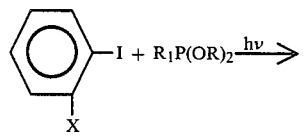

Alternately, other known procedures can be utilized to prepare the compounds used in this invention. For example, substituted aryldichlorophosphines can be reacted with lower alkanols in the presence of a base. After filtering, the filtrate is treated with a catalytic amount of an alkyl halide, preferably an alkyl iodide, to yield the desired phosphinic compound. The above described reaction scheme is illustrated generally as follows:

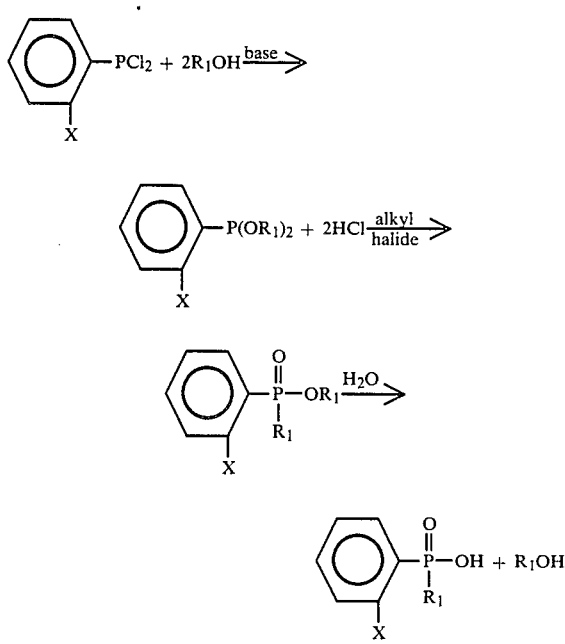

Salts such as the ammonium salt and calcium salt of the substituted phenylphosphinic acids are obtained by dissolving the free acid in acetone or another suitable solvent and reacting the free acid with the hydroxide of the appropriate cation.

The substituted phenylphosphinic acid derivatives and salts thereof used in the present invention can be administered by various conventional means such as injection, infusion, time-release implant, transdermally, or as a feed supplement in the form of feed or drinking water additives. Administration as a feed or drinking water additive is preferred since this route is the most economical.

When administered as a feed supplement, an effective daily dosage is between about 0.005 and 350 mg/animal. The specific dosage depending on the specie and weight of the animal and the desired production trait to be improved such as feed to weight gain efficiency. If administered by injection, infusion or time-release implant, the lower limit of the daily dosage range may possibly be decreased due to the absence of the absorption barrier or degradation in the small intestine of the animal. It is also expected that one may combine the growth promotant compounds of the present invention with a facilitator to enhance absorption in the animal gut after which the facilitator is freed as by an in vivo process such as hydrolysis. Accordingly, such facilitator/growth promotant addition complexes are considered equivalents within the scope of the present invention. The following table illustrates the daily dosage range in milligrams per head for representative animals.

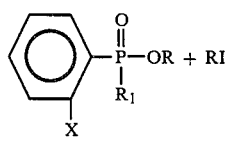

TABLE

Daily Dosage for Representative Animals

| Animal | Daily Dosage mg/animal |
|---|---|
| Swine: 0-8 wks 2-20 kg | 0.1-125 |
| Swine: growing 20-100 kg | 0.4-350 |
| Chickens: 0-8 wks 0.02-2.0 kg | 0.005-20 |
| Hens: laying 1.8 kg | 0.025-10 |
| Turkeys: 0-24 wks 0.1-10 kg | 0.05-80 |

The compounds of Formula (I) are preferably supplied in the form of a liquid or solid supplement premix in which the concentration is as much as two thousand times greater than the desired concentration. The compounds of Formula (I) can be dissolved or suspended in a fluid dispensing agent such as molasses, distillers solubles, cottonseed oil and, corn oil and the like to prepare a fluid premix. Alternately, a solid premix can be prepared by mixing a compound of Formula (I) with an edible solid dispensing agent such as soybean mill feed, sucrose, lactose, cornmeal, rice hulls, flour, calcium carbonate, starch and the like. Examples of suitable other ingredients are non-interfering anthelmintics, antibiotics, coccidiostats, mold inhibitors, vaccines, amino acids, steroids, vitamins and minerals.

The substituted phenylphosphinic acid derivatives and salts thereof represented generally by Formula (I) can be employed to improve feed utilization or tissue production in animal species such as avian and porcine.

The following examples are included to illustrate the improved feed utilization and/or tissue producing effect of the substituted phenylphosphinic acid derivatives of the present invention. It should be understood that examples are included to illustrate the practice of the present invention and are not intended to limit the scope of the invention. It should be further understood that the dosage levels recited in the following examples are only illustrative and are not meant to limit the scope of the invention. Unless otherwise noted, all percentages are by weight. Comparisons are between the numerical average for treated animals and the numerical average for untreated animals.

EXAMPLE 1

A broiler diet for growing chicks was prepared from the following types and amounts of ingredients:

| | Wt. % |
|---|---|
| Ground yellow corn | 58.93 |
| Soybean oil meal | 32.46 |
| Broiler base[1] | 3.50 |
| Yellow grease, 8360 kcal/kg | 4.99 |
| Monensin sodium | 0.12 |

| [1]ANALYSIS | PER KILOGRAM |
|---|---|
| Calcium | Min. 22% Max. 24% |
| Phosphorus | Min. 8.05% |
| Sodium Chloride | Min. 8.0% Max. 9.0% |
| Vitamim A, USP Units | 189,200 |
| Vitamin D$_3$, IC Units | 63,800 |
| Vitamin E, I Units | 189 |
| Menadione Dimethylpyrimidinol Bisulfite, Mgs | 264 |
| Vitamin B$_{12}$, Mgs | .29 |
| Riboflavin, Mgs | 158 |
| d-Pantothenic Acid, Mgs | 253 |
| Niacin, Mgs | 946 |
| Choline Chloride, Mgs | 17,600 |
| Thiamine, Mgs | 33 |
| Pyridoxine, Mgs. | 33 |
| Folic Acid, Mgs. | 20 |
| Biotin, Mgs. | 3.3 |
| Manganese (Mn) | .171% |
| Iron (Fe) | .143% |
| Copper (Cu) | .0143% |
| Zinc (Zn) | .214% |
| Iodine (I) | .0014% |
| Selenium (Se) | .00028% |

Ingredients

Dicalcium phosphate, calcium carbonate, salt, vitamin A acetate, D-activated animal sterol (source of D$_3$), Vitamin E-supplement, menadione dimethylpyrimidinol bisulfite (source of vitamin K activity), vitamin B$_{12}$ supplement, riboflavin supplement, d-calcium pantothenate, niacin supplement, choline chloride, thiamine mononitrate, pyridoxine hydrochloride, folic acid, biotin, ethoxyquin (a preservative added at 1.65 gm/kg), methionine hydroxy analogue (added at 35.2 gm/kg) manganous oxide, iron sulfate, copper oxide, zinc oxide, ethylene diamine dihydriodide, sodium selenite.

One day old chicks having an average weight of forty grams were fed a finished feed comprising 2-methoxyphenylmethylphosphinic acid at a concentration ranging between 0.5 and 4.0 milligrams per kilogram feed throughout a growing period ranging between fourteen and twenty-one days. Treated chicks gained weight as much as five percent faster than untreated chicks. Treated chicks converted feed to weight as much as three percent more efficiently than untreated chicks.

EXAMPLE 2

A swine diet for growing pigs prepared from the following types and amounts of ingredients:

| | Wt. % |
|---|---|
| Corn, ground | 82.25 |
| Soybean oil meal, 44% | 15.00 |
| Swine base-growing/finishing[1] | 2.75 |

| [1]ANALYSIS | PER KILOGRAM |
|---|---|
| Calcium | Min 20% Max 22% |
| Phosphorus | Min 8.5% |
| Sodium chloride | Min 12% Max 14.4% |
| Vitamin A | 242,000 USP units |
| Vitamin D$_3$ | 66,000 USP units |
| Vitamin E | 770 I.U. |

Ingredients

Calcium phosphate, calcium carbonate, salt, potassium chloride, magnesium oxide, vitamin A acetate in gelatin, D-activated animal sterol (source of vitamin D$_3$), vitamin E supplement, menadione dimethylpyrimidinol bisulfite (source of vitamin K activity), riboflavin supplement, d-calcium pantothenate, niacin, vitamin B12 supplement, choline chloride, ferrous sulfate, zinc oxide, manganous oxide, copper oxide, ethylene diamine dihydriodide, cobalt carbonate and sodium selenite.

Three trials were conducted wherein pigs were administered 2-methoxyphenylmethylphosphinic acid at dosage levels of 2.0, 10.0, 20.0 (TRIAL I); 0.5, 2.0, 8.0 (TRIAL II); and 0.5, 2.0, 8.0 (TRIAL III) milligrams per kilogram of finished feed throughout a growing period of about 18-90 kg. Pigs administered the above-identified additive at dosage levels of 10.0 and 20.0 mg/kg gained weight faster than untreated pigs. In trials I and II treated pigs showed both faster daily weight gain and improved feed efficiency at a dosage level of 2.0 mg/kg.

EXAMPLE 3

2-methylphenylmethylphosphinic acid was usefully administered to chicks following the procedure of Example 1 at dose levels ranging between 0.5 and 4.0 milligrams per kilogram of feed during a growing period ranging between 45 and 48 days. Treated chicks converted feed to weight gain more efficiently than untreated chicks.

EXAMPLE 4

2-nitrophenylmethylphosphinic acid was usefully administered to chicks following the procedure described in Example 1. At a dose level of 1 mg and 10 mg of the above-identified additive per kilogram of feed, treated chicks showed a higher average daily weight gain than untreated chicks.

EXAMPLE 5

2-chlorophenylmethylphosphinic acid was usefully administered to chicks following the procedure described in Example 1. At a dose level of 0.5 mg of the above-identified additive per kilogram of feed, treated chicks showed a higher daily weight gain than untreated chicks.

EXAMPLE 6

Ammonium 2-hydroxyphenylmethylphosphinate was usefully administered to chicks following the procedure described in Example 1. At a dose level of 1 mg and 10 mg of the above-identified additive per kilogram of feed, treated chicks showed a higher average daily weight gain than untreated chicks.

EXAMPLE 7

2-carboxylphenylmethylphosphinic acid was usefully administered to chicks following the procedure described in Example 1. At a dose level of 11 mg the above-identified additive per kilogram of feed, treated chicks showed a higher average daily weight gain than untreated chicks.

EXAMPLE 8

2-methoxyphenylethylphosphinic acid was usefully administered to chicks following the procedure described in Example 1. At a dose level of 10 mg of the above-identified additive per kilogram of feed, treated chicks showed a higher average daily weight gain than untreated chicks.

EXAMPLE 9

The hydrochloride salt of 2-aminophenylmethylphosphinic acid was usefully administered to chicks following the procedure described in Example 1. At a dose level of 2.0 mg of the above-identified additive per kilogram of feed, treated chicks showed a higher average daily weight gain than untreated chicks.

EXAMPLE 10

2-methoxyphenylmethylphosphinic acid was usefully administered to chicks following the procedure described in Example 1. At dose levels of 1, 20, 60 or 100 mg of the above-identified additive per kilogram of feed, treated chicks showed a higher average daily gain and converted feed to weight gain more efficiently than untreated chicks.

We claim:

1. A method of improving feed utilization or tissue production in animals which comprises administering to animals a feed supplement comprising an effective amount of at least one substituted phenylphosphinic acid derivative represented by the structure:

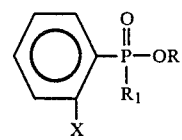

where R is selected from the group consisting of hydrogen, alkyl, aryl and suitable cationic radicals forming pharmaceutically acceptable salts thereof; $R_1$ is lower n-alkyl; and X is selected from the group consisting of hydroxy, halo, amino, carboxy, nitro, lower n-alkoxy and lower n-alkylamino radicals.

2. The method of claim 1 in which R is selected from the group consisting of hydrogen, and suitable cationic radicals forming pharmaceutically acceptable salts thereof; $R_1$ is lower n-alkyl radicals; and X is selected from the group consisting of hydroxy, halo, amino, carboxy, nitro and lower n-alkoxy.

3. The method of claim 1 in which R is selected from the group consisting of hydrogen and suitable cationic radicals forming pharmaceutically acceptable salts thereof; $R_1$ is methyl; and X is selected from the group consisting of hydroxy, halo, amino, carboxy, nitro and lower n-alkoxy.

4. The method of claim 1 in which R is hydrogen; $R_1$ is methyl and X is selected from the group consisting of hydroxyl and lower alkoxy radicals.

5. The method of claim 1 in which the substituted phenylphosphinic acid derivative is administered as a feed additive.

6. The method of claim 1 in which the substituted phenylphosphinic acid derivative is administered as a drinking water additive.

7. The method of claim 1 in which the substituted phenylphosphinic acid derivative is administered as a feed additive in an amount between about 0.005 to 350 milligrams per animal per day.

8. The method of claim 1, 2, 3 or 4 in which the animal is avian.

9. The method of claim 1, 2, 3 or 4 in which the animal is porcine.

10. A method of improving feed utilization or tissue production in animals which comprises administering to animals a feed supplement comprising an effective amount of 2-methoxyphenylmethylphosphinic acid.

11. The method of claim 10 in which the animal is avian.

12. The method of claim 10 in which the animal is porcine.

13. The method of claim 10 in which the animal is a chicken.

* * * * *